United States Patent
Kidani et al.

(10) Patent No.: US 12,375,725 B2
(45) Date of Patent: Jul. 29, 2025

(54) IMAGE DECODING DEVICE, IMAGE DECODING METHOD, AND PROGRAM

(71) Applicant: KDDI CORPORATION, Tokyo (JP)

(72) Inventors: Yoshitaka Kidani, Fujimino (JP); Kyohei Unno, Fujimino (JP); Kei Kawamura, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 71 days.

(21) Appl. No.: 18/062,993

(22) Filed: Dec. 7, 2022

(65) Prior Publication Data

US 2023/0103543 A1 Apr. 6, 2023

Related U.S. Application Data

(63) Continuation of application No. PCT/JP2021/021276, filed on Jun. 3, 2021.

(30) Foreign Application Priority Data

Jun. 8, 2020 (JP) ................................ 2020-099716

(51) Int. Cl.
*H04N 19/70* (2014.01)
*H04N 19/513* (2014.01)

(52) U.S. Cl.
CPC ........... *H04N 19/70* (2014.11); *H04N 19/513* (2014.11)

(58) Field of Classification Search
CPC .............................. H04N 19/70; H04N 19/513
See application file for complete search history.

(56) References Cited

U.S. PATENT DOCUMENTS

2023/0103543 A1 4/2023 Kidani et al.

FOREIGN PATENT DOCUMENTS

JP 7387806 B2 11/2023
WO 2020098808 A1 5/2020

OTHER PUBLICATIONS

Bross et al.; "VVC (draft 9)"; JVET-R2001; Apr. 24, 2020 (Year: 2020).*
Yu et al.; "AHG9: MMVD syntax modifications"; JVET-R0214; Apr. 24, 2020 (Year: 2020).*
Kidani et al.; "AHG9: On MMVD flag in SPS and PH"; JVET-S0227; Jun. 11, 2020 (Year: 2020).*
Bross, Benjamin et al., "Versatile Video Coding (Draft 9)", Joint Video Experts Team (JVET) of ITU-T SG 16 WP 3 and ISO/IEC JTC 1/SC 29/WG 11, JVET,R2001-vA, May 15, 2020.

(Continued)

*Primary Examiner* — Jonathan R Messmore
(74) *Attorney, Agent, or Firm* — Troutman Pepper Locke LLP

(57) ABSTRACT

An image decoding device according to the present invention including a decoding unit configured to decode first syntax that controls transmission precision of a merge with motion vector difference in a sequence of a decoding target, wherein the value of the first syntax being "1" specifies that both fractional precision and integer precision could be used as the transmission precision of the merge with motion vector difference in the sequence of the decoding target, and the value of the first syntax being "0" specifies that the first syntax uses fractional precision as the transmission precision of a merge with motion vector difference in the sequence of the decoding target.

3 Claims, 14 Drawing Sheets

| seq_parameter_set_rbsp( ) { | Descriptor |
|---|---|
| sps_seq_parameter_set_id | u(4) |
| ... | |
| sps_mmvd_enabled_flag | u(1) |
| if( sps_mmvd_enabled_flag ) | |
|    sps_mmvd_fullpel_only_flag | u(1) |
| ... | |
| } | |

(56) References Cited

OTHER PUBLICATIONS

Jeong, Seung-Soo et al., "CE4 Ultimate motion vector expression (Test 4.5.4)", Joint Video Experts Team (JVET) of ITU-T SG 16 WP 3 and ISO/IEC JTC 1/SC 29/ WG 11, JVET-L0054, Sep. 21, 2018.
Kidani, Yoshitaka et al., "AHG9: On MMVD flag in SPS and PH", Joint Video Experts Team (JVET) of ITU-T SG 16 WP 3 and ISO/IEC JTC 1/SC 29/WG 11, JVET-S0227, Jun. 11, 2020.
International Search Report dated Aug. 3, 2021, from corresponding International application No. PCT/JP2021/021276.
Extended European Search Report dated Oct. 5, 2023, from corresponding European Application No. EP21822640.5.
Yu (Ericsson) R et al., "AHG9: MMVD syntax modifications", 130. MPEG Meeting; Apr. 20, 2020-Apr. 24, 2020; Alpbach; (Motion Picture Expert Group or ISO/IEC JTC1/SC29/WG11), No. m53191; JVET-R0214 (Apr. 3, 2020), XP030286186.
Jang (Lge) H et al., "Non-CE8: MMVD Motion vector rounding for SCC", 126. Mpeg Meeting; Mar. 25, 2019-Mar. 29, 2019; Geneva; (Motion Picture Expert Group or ISO/IEC JTC1/SC29/WG11), No. m47126 (Mar. 13, 2019), XP030210800.
Notice of Reasons for Refusal dtd Jun. 13, 2023, from corresponding Japanese Application No. 2022-080426.
Jack Enhorn et al., "AHG9: Reduce Redundant Signaling in Picture Header", Joint Video Experts Team (JVET) of ITU-T SG 16 WP 3 and ISO/IEC JTC 1/SC 29/ WG 11, JVET-R0258, 18th Meeting: by teleconference, Apr. 15-24, 2020.
Notice of Reasons for Refusal and English translation dated Dec. 3, 2024, from corresponding Japanese Application No. 2023-194119.

\* cited by examiner

FIG. 5

| seq_parameter_set_rbsp( ) { | Descriptor |
|---|---|
|    sps_seq_parameter_set_id | u(4) |
|    ... | |
|    sps_mmvd_enabled_flag | u(1) |
|    if( sps_mmvd_enabled_flag ) | |
|      sps_mmvd_fullpel_only_flag | u(1) |
|    ... | |
| } | |

FIG. 6

| pic_parameter_set_rbsp( ) { | Descriptor |
|---|---|
|    pps_pic_parameter_set_id | u(6) |
|    pps_seq_parameter_set_id | u(4) |
|    ... | |
| } | |

FIG. 7

| picture_header_structure( ) { | Descriptor |
|---|---|
| ... | |
|   ph_pic_parameter_set_id | ue(v) |
| ... | |
|   if( !sps_mmvd_fullpel_only_flag ) | |
|     ph_mmvd_fullpel_only_flag | u(1) |
| ... | |
| } | |

FIG. 8

| slice_header( ) { | Descriptor |
|---|---|
|   sh_picture_header_in_slice_header_flag | u(1) |
|   if( sh_picture_header_in_slice_header_flag ) | |
|     picture_header_structure( ) | |
|   ... | |
|   if( !sps_mmvd_fullpel_only_flag ) | |
|     slice_mmvd_fullpel_only_flag | u(1) |
|   ... | |
| } | |
|   ... | |

FIG. 9

| seq_parameter_set_rbsp( ) { | Descriptor |
|---|---|
|   sps_seq_parameter_set_id | u(4) |
|   ... | |
|   sps_mmvd_enabled_flag | u(1) |
|   if( sps_mmvd_enabled_flag ) | |
|     sps_mmvd_fullpel_enabled_flag | u(1) |
|   ... | |
| } | |

FIG. 10

| picture_header_structure( ) { | Descriptor |
|---|---|
| ... | |
|   ph_pic_parameter_set_id | ue(v) |
| ... | |
|   if( sps_mmvd_fullpel_enabled_flag ) | |
|     ph_mmvd_fullpel_only_flag | u(1) |
| ... | |
| } | |

FIG. 11

| slice_header( ) { | Descriptor |
|---|---|
| sh_picture_header_in_slice_header_flag | u(1) |
| if( sh_picture_header_in_slice_header_flag ) | |
| picture_header_structure( ) | |
| ... | |
| if( sps_mmvd_fullpel_enabled_flag ) | |
| slice_mmvd_fullpel_only_flag | u(1) |
| ... | |
| } | |
| ... | |

FIG. 13

| mmvd_distance_idx[ x0 ][ y0 ] | MmvdDistance[ x0 ][ y0 ] | |
|---|---|---|
| | ph_mmvd_fullpel_only_flag == 0 | ph_mmvd_fullpel_only_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

FIG. 14

| mmvd_direction_idx[ x0 ][ y0 ] | MmvdSign[ x0 ][ y0 ][0] | MmvdSign[ x0 ][ y0 ][1] |
|---|---|---|
| 0 | +1 | 0 |
| 1 | −1 | 0 |
| 2 | 0 | +1 |
| 3 | 0 | −1 |

IMAGE DECODING DEVICE, IMAGE DECODING METHOD, AND PROGRAM

CROSS-REFERENCE TO RELATED APPLICATIONS

The present application is a continuation based on PCT Application No. PCT/JP2021/021276, filed on Jun. 3, 2021, which claims the benefit of Japanese patent application No. 2020-099716, filed on Jun. 8, 2020. The content of all of which are incorporated by reference herein in their entirety.

TECHNICAL FIELD

The present invention relates to an image decoding device, an image decoding method, and a program.

BACKGROUND

In Versatile Video Coding (Draft 9), JVET-R2001, syntax that can control whether to use integer precision as the transmission precision of a merge with motion vector difference (MMVD: Merge with MVD) or not is provided as syntax (sps_mmvd_fullpel_only_flag) of a sequence parameter set (SPS: Sequence Parameter Set) and syntax (ph_mmvd_fullpel_only_flag) of a picture header (PH: Picture Header).

SUMMARY

However, Versatile Video Coding (Draft 9), JVET-R2001 has a problem.

The ph_mmvd_fullpel_only_flag is defined to be decoded even if sps_mmvd_fullpel_only_flag is effective (in other words, if the transmission precision of MMVD in a sequence unit is specified to be integer precision).

In other words, Versatile Video Coding (Draft 9), JVET-R2001 has the problem that ph_mmvd_fullpel_only_flag is unnecessarily decoded even though the transmission precision of MMVD is specified to be integer precision by sps_mmvd_fullpel_only_flag.

Thus, the present invention has been accomplished in view of the foregoing problem. It is an object of the present invention to provide an image decoding device, an image decoding method, and a program capable of reducing unnecessary syntax decoding processing volumes and bit volumes by decoding syntax, which controls the transmission precision of MMVD in a sequence unit, and, only when the transmission precision of the MMVD has not been determined (in other words, when both of fractional precision and integer precision may be used as the transmission precision of the MMVD), decoding syntax, which controls the transmission precision of MMVD in a picture unit.

The first aspect of the present invention is summarized as an image decoding device including: a decoding unit configured to decode first syntax that controls transmission precision of a merge with motion vector difference in a sequence of a decoding target, wherein a value of the first syntax being "1" specifies that the first syntax may use integer precision as the transmission precision of a merge with motion vector difference in the sequence of the decoding target, and the value of the first syntax being "0" specifies that the first syntax uses fractional precision as the transmission precision of a merge with motion vector difference in the sequence of the decoding target.

The second aspect of the present invention is summarized as an image decoding method including decoding first syntax that controls transmission precision of a merge with motion vector difference in a sequence of a decoding target, wherein a value of the first syntax being "1" specifies that the first syntax may use integer precision as the transmission precision of a merge with motion vector difference in the sequence of the decoding target, and the value of the first syntax being "0" specifies that the first syntax uses fractional precision as the transmission precision of a merge with motion vector difference in the sequence of the decoding target.

The third aspect of the present invention is summarized as a program that causes a computer to function as an image decoding device, the image decoding device including a decoding unit configured to decode first syntax that controls transmission precision of a merge with motion vector difference in a sequence of a decoding target, wherein a value of the first syntax being "1" specifies that the first syntax may use integer precision as the transmission precision of a merge with motion vector difference in the sequence of the decoding target, and the value of the first syntax being "0" specifies that the first syntax uses fractional precision as the transmission precision of a merge with motion vector difference in the sequence of the decoding target.

According to the present invention, it is possible to provide an image decoding device, an image decoding method, and a program capable of reducing unnecessary syntax decoding processing volumes and bit volumes by decoding syntax, which controls the transmission precision of MMVD in a sequence unit, and, only when the transmission precision of the MMVD has not been determined (in other words, when both of fractional precision and integer precision may be used as the transmission precision of the MMVD), decoding syntax, which controls the transmission precision of MMVD in a picture unit.

BRIEF DESCRIPTION OF DRAWINGS

FIG. 5 is an example of control data included in SPS 211.

FIG. 6 is an example of control data included in PPS 212.

FIG. 7 is an example of control data included in a picture header 213.

FIG. 8 is an example of control data included in a slice header 214A/214B.

FIG. 9 is a diagram for describing a modification example of the embodiment.

FIG. 10 is a diagram for describing the modification example of the embodiment.

FIG. 11 is a diagram for describing the modification example of the embodiment.

FIG. 13 is a diagram illustrating a method of correcting a motion vector by a MMVD unit 241A3 according to the embodiment.

FIG. 14 is a diagram illustrating a method of correcting the motion vector by the MMVD unit 241A3 according to the embodiment.

DETAILED DESCRIPTION

An embodiment of the present invention will be described hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

First Embodiment

Figure 1:
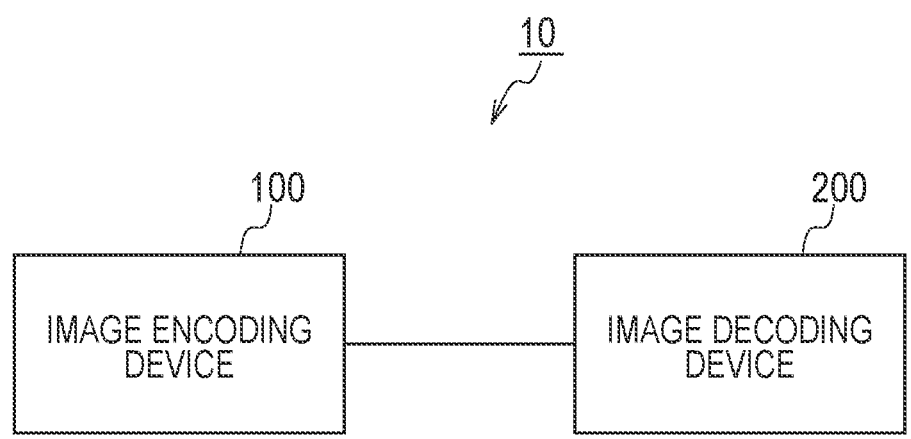
FIG. 1 is a diagram illustrating an example of a configuration of an image processing system 1 according to an embodiment.

Hereinafter, an image processing system 10 according to a first embodiment of the present invention will be described with reference to FIGS. 1 to 10. FIG. 1 is a diagram illustrating the image processing system 10 according to the present embodiment.

As illustrated in FIG. 1, the image processing system 10 according to the present embodiment includes an image coding device 100 and an image decoding device 200.

The image coding device 100 is configured to generate coded data by coding an input image signal. The image decoding device 200 is configured to generate an output image signal by decoding the coded data.

The coded data may be transmitted from the image coding device 100 to the image decoding device 200 via a transmission path. The coded data may be stored in a storage medium and then provided from the image coding device 100 to the image decoding device 200.

(Image Coding Device 100)

Figure 2:
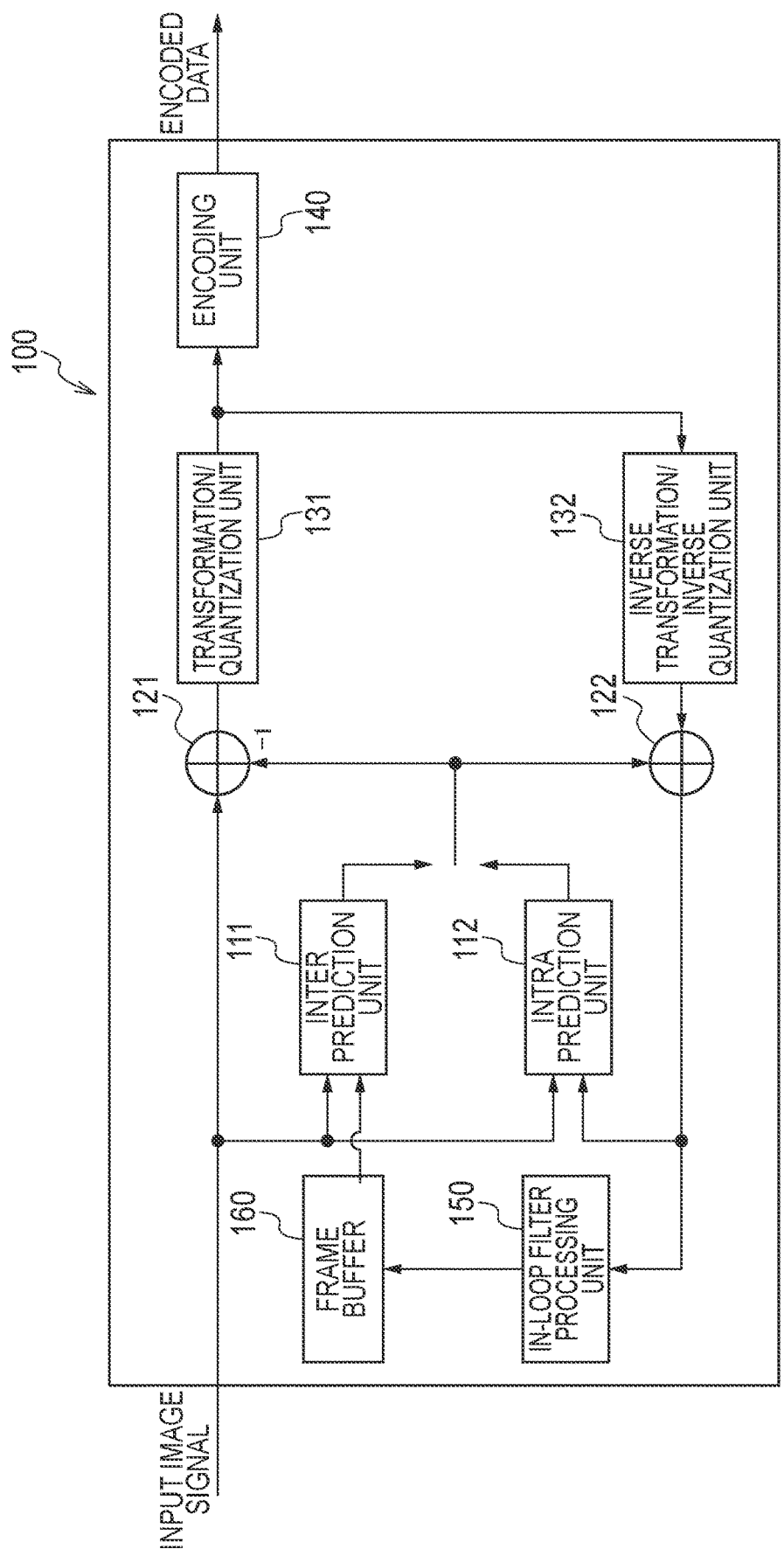
FIG. 2 is a diagram illustrating an example of function blocks of an image encoding device 100 according to the embodiment.
Figure 3:
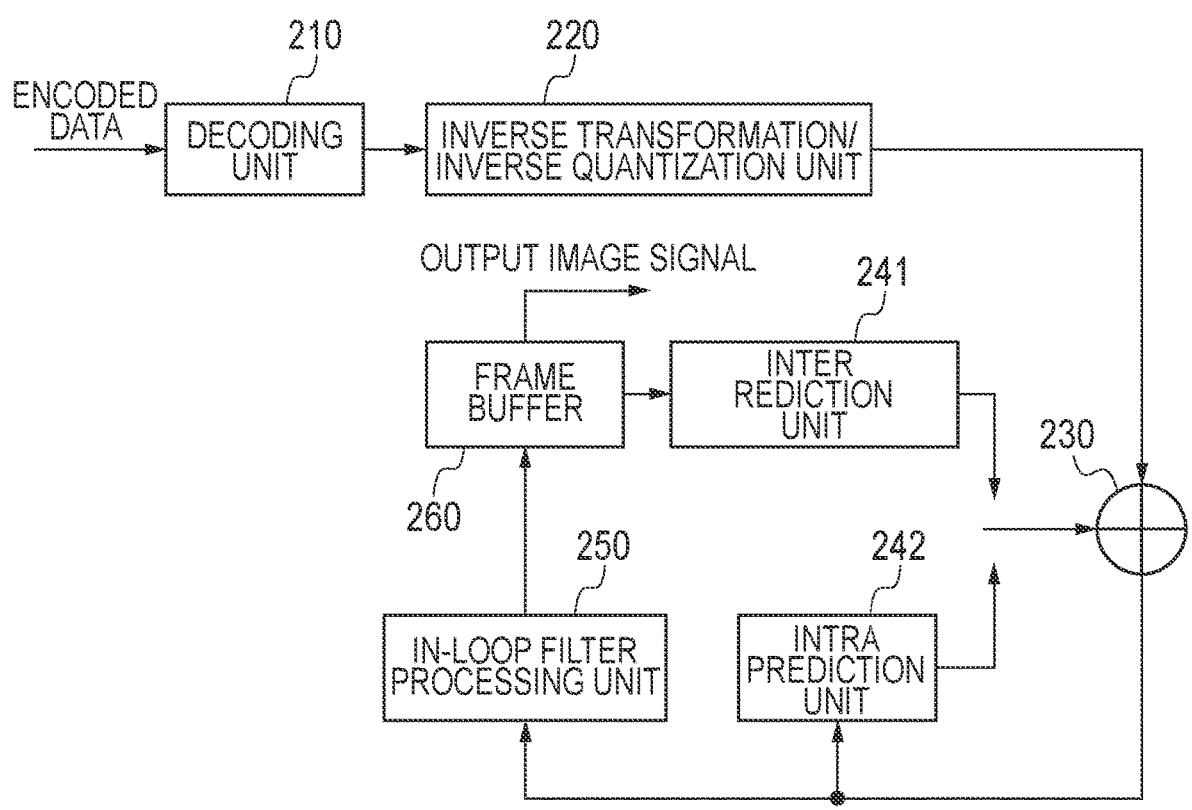
FIG. 3 is a diagram illustrating an example of function blocks of an image decoding device 200 according to the embodiment.

Hereinafter, the image coding device 100 according to the present embodiment will be described with reference to FIG. 2. FIG. 2 is a diagram illustrating an example of functional blocks of the image coding device 100 according to the present embodiment.

As shown in FIG. 2, the image coding device 100 includes an inter prediction unit 111, an intra prediction unit 112, a subtractor 121, an adder 122, a transform/quantization unit 131, an inverse transform/inverse quantization unit 132, a coding unit 140, an in-loop filtering processing unit 150, and a frame buffer 160.

The inter prediction unit 111 is configured to generate a prediction signal by inter prediction (inter-frame prediction).

Specifically, the inter prediction unit 111 is configured to specify a reference block included in a reference frame by comparing a frame to be coded (hereinafter, referred to as a target frame) with the reference frame stored in the frame buffer 160, and determine a motion vector (mv) for the specified reference block.

The inter prediction unit 111 is configured to generate the prediction signal included in a block to be coded (hereinafter, referred to as a target block) for each target block based on the reference block and the motion vector. The inter prediction unit 111 is configured to output the prediction signal to the subtractor 121 and the adder 122. Here, the reference frame is a frame different from the target frame.

The intra prediction unit 112 is configured to generate a prediction signal by intra prediction (intra-frame prediction).

Specifically, the intra prediction unit 112 is configured to specify the reference block included in the target frame, and generate the prediction signal for each target block based on the specified reference block. Furthermore, the intra prediction unit 112 is configured to output the prediction signal to the subtractor 121 and the adder 122.

Here, the reference block is a block referred to for the target block. For example, the reference block is a block adjacent to the target block.

The subtractor 121 is configured to subtract the prediction signal from the input image signal, and output a prediction residual signal to the transform/quantization unit 131. Here, the subtractor 121 is configured to generate the prediction residual signal that is a difference between the prediction signal generated by intra prediction or inter prediction and the input image signal.

The adder 122 is configured to add the prediction signal to the prediction residual signal output from the inverse transform/inverse quantization unit 132 to generate a pre-filtering decoded signal, and output the pre-filtering decoded signal to the intra prediction unit 112 and the in-loop filtering processing unit 150.

Here, the pre-filtering decoded signal constitutes the reference block used by the intra prediction unit 112.

The transform/quantization unit 131 is configured to perform transform processing for the prediction residual signal and acquire a coefficient level value. Furthermore, the transform/quantization unit 131 may be configured to perform quantization of the coefficient level value.

Here, the transform processing is processing of transforming the prediction residual signal into a frequency component signal. In such transform processing, a base pattern (transformation matrix) corresponding to discrete cosine transform (Hereinafter referred to as DCT) may be used, or a base pattern (transformation matrix) corresponding to discrete sine transform (Hereinafter referred to as DST) may be used.

The inverse transform/inverse quantization unit 132 is configured to perform inverse transform processing for the coefficient level value output from the transform/quantization unit 131. Here, the inverse transform/inverse quantization unit 132 may be configured to perform inverse quantization of the coefficient level value prior to the inverse transform processing.

Here, the inverse transform processing and the inverse quantization are performed in a reverse procedure to the transform processing and the quantization performed by the transform/quantization unit 131.

The coding unit 140 is configured to code the coefficient level value output from the transform/quantization unit 131 and output coded data.

Here, for example, the coding is entropy coding in which codes of different lengths are assigned based on a probability of occurrence of the coefficient level value.

Furthermore, the coding unit 140 is configured to code control data used in decoding processing in addition to the coefficient level value.

Here, the control data may include size data such as a coding block (coding unit (CU)) size, a prediction block (prediction unit (PU)) size, and a transform block (transform unit (TU)) size.

Furthermore, the control data may include header information such as a sequence parameter set (SPS), a picture parameter set (PPS), and a slice header as described later.

The in-loop filtering processing unit 150 is configured to execute filtering processing on the pre-filtering decoded signal output from the adder 122 and output the filtered decoded signal to the frame buffer 160.

Herein, for example, the filter processing is deblocking filter processing, which reduces the distortion generated at boundary parts of blocks (encoded blocks, prediction blocks, or conversion blocks), or adaptive loop filter processing, which switches filters based on filter coefficients, filter selection information, local properties of picture patterns of an image, etc. transmitted from the image encoding device 100.

The frame buffer 160 is configured to accumulate the reference frames used by the inter prediction unit 111.

Here, the filtered decoded signal constitutes the reference frame used by the inter prediction unit 111.

(Image Decoding Device 200)

Figure 4:
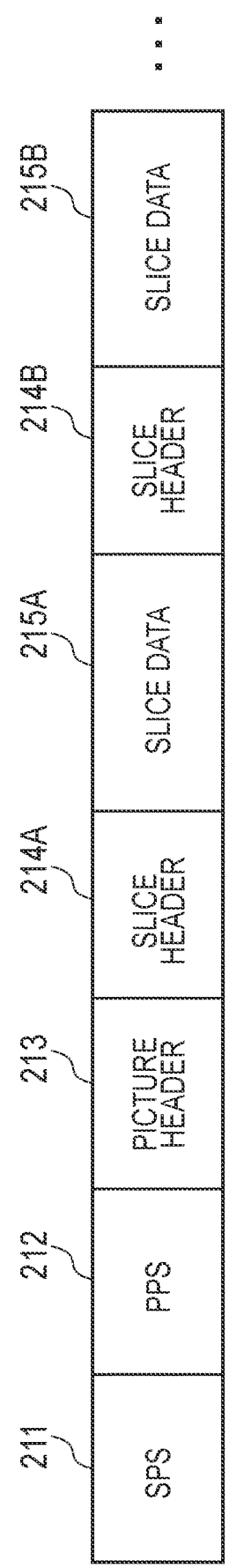
FIG. 4 is an example of a configuration of encoded data (bit stream) received by a decoding unit 210 of the image decoding device 200 according to the embodiment.

Hereinafter, the image decoding device 200 according to the present embodiment will be described with reference to FIG. 4. FIG. 4 is a diagram illustrating an example of functional blocks of the image decoding device 200 according to the present embodiment.

As illustrated in FIG. 4, the image decoding device 200 includes a decoding unit 210, an inverse transform/inverse quantization unit 220, an adder 230, an inter prediction unit 241, an intra prediction unit 242, an in-loop filtering processing unit 250, and a frame buffer 260.

The decoding unit 210 is configured to decode the coded data generated by the image coding device 100 and decode the coefficient level value.

Here, the decoding is, for example, entropy decoding performed in a reverse procedure to the entropy coding performed by the coding unit 140.

Furthermore, the decoding unit 210 may be configured to acquire control data by decoding processing for the coded data. Note that, as described above, the control data may include size data such as a coding block size, a prediction block size, and a transform block size.

The inverse transform/inverse quantization unit 220 is configured to perform inverse transform processing for the coefficient level value output from the decoding unit 210. Here, the inverse transform/inverse quantization unit 220 may be configured to perform inverse quantization of the coefficient level value prior to the inverse transform processing.

Here, the inverse transform processing and the inverse quantization are performed in a reverse procedure to the transform processing and the quantization performed by the transform/quantization unit 131.

The adder 230 is configured to add the prediction signal to the prediction residual signal output from the inverse transform/inverse quantization unit 220 to generate a pre-filtering decoded signal, and output the pre-filtering decoded signal to the intra prediction unit 242 and the in-loop filtering processing unit 250.

Here, the pre-filtering decoded signal constitutes a reference block used by the intra prediction unit 242.

Similarly to the inter prediction unit 111, the inter prediction unit 241 is configured to generate a prediction signal by inter prediction (inter-frame prediction).

Specifically, the inter prediction unit 241 is configured to generate the prediction signal for each prediction block based on the motion vector decoded from the coded data and the reference signal included in the reference frame. The inter prediction unit 241 is configured to output the prediction signal to the adder 230.

Similarly to the intra prediction unit 112, the intra prediction unit 242 is configured to generate a prediction signal by intra prediction (intra-frame prediction).

Specifically, the intra prediction unit 242 is configured to specify the reference block included in the target frame, and generate the prediction signal for each prediction block based on the specified reference block. The intra prediction unit 242 is configured to output the prediction signal to the adder 230.

Similarly to the in-loop filtering processing unit 150, the in-loop filtering processing unit 250 is configured to execute filtering processing on the pre-filtering decoded signal output from the adder 230 and output the filtered decoded signal to the frame buffer 260.

Herein, for example, the filter processing is deblocking filter processing, which reduces the distortion generated at boundary parts of blocks (encoded blocks, prediction blocks, conversion blocks, or sub-blocks obtained by dividing them), or adaptive loop filter processing, which switches filters based on filter coefficients, filter selection information, local properties of picture patterns of an image, etc. transmitted from the image encoding device 100.

Similarly to the frame buffer 160, the frame buffer 260 is configured to accumulate the reference frames used by the inter prediction unit 241.

Here, the filtered decoded signal constitutes the reference frame used by the inter prediction unit 241.

(Decoding Unit 210)

Hereinafter, the control data, which is encoded by the encoding unit 140 and decoded by the decoding unit 210, will be described by using FIG. 4 to FIG. 8.

FIG. 4 is an example of a configuration of the encoded data (hereinafter, bit stream) received by the decoding unit 210.

The bit stream may include a SPS 211 at the head thereof. The SPS is a set of control data in a sequence (picture set) unit. A specific example will be described later. Each SPS 211 includes at least SPS id information for identifying each SPS when plural SPSs 211 are present.

Also, the bit stream may include a PPS 212 next to the SPS 211. The PPS 212 is a set of control data in a picture (slice set) unit. Each PPS 212 includes at least PPS id information for identifying each PPS when plural PPSs 212 are present. Also, each PPS 212 includes at least the SPS id information for specifying the SPS 211 corresponding to each PPS 212.

Also, the bit stream may include a picture header 213 next to the PPS 212. The picture header 213 is also a set of control data in a picture (slice set) unit. Regarding the PPS 212, the single PPS 212 can be shared by plural pictures. On the other hand, the picture header 213 is always transmitted for each picture. The picture header 213 includes at least the PPS id information for specifying the PPS 212 corresponding to each picture.

Also, the bit stream may include a slice header 214A next to the picture header 213. The slice header 214A is a set of control data in a slice unit. A specific example will be described later. The slice header 214A can also include the information of the above described picture header 213 as part of the slice header 214A.

Also, the bit stream may include slice data 215A next to the slice header 214A. The slice data 215A may include the above described coefficient level value, the size data, etc.

As described above, the bit stream has the configuration in which the single slice header 214A/214B, the picture header 213, the PPS 212, and the SPS 211 correspond to each slice data 215A/215B.

As described above, which PPS 212 is to be referenced is specified by the PPS id in the picture header 213, and which SPS 211 is to be referenced by the PPS 212 is specified by the SPS id. Therefore, the common SPS 211 and PPS 212 can be used for the plural pieces of slice data 215A/215B.

In other words, the SPS 211 and the PPS 212 are not always required to be transmitted for each picture or each slice.

For example, as illustrated in FIG. 4, the bit stream may be configured not to encode the SPS 211 and the PPS 212 immediately in front of the slice header 214B/215B.

Note that the configuration of FIG. 4 is merely an example. For example, as long as the bit stream is configured so that the control data specified by the slice header 214B/215B, the picture header 213, the PPS 212, and the SPS 211 corresponds to each slice data 215A/215B, another element(s) other than those described above may be added as a constituent element(s) of the bit stream. Similarly, for transmission, the bit stream may be formed into a configuration different from that of FIG. 4.

FIG. 5 is an example of the control data included in the SPS 211.

As described above, the SPS 211 at least includes the SPS id information (sps_seq_parameter_set_id) for identifying the SPS 211.

The SPS 211 may include syntax (sps_mmvd_enabled_flag) which controls whether the later-described merge with motion vector difference (MMVD: Merge with MVD) of a decoding target sequence can be used or not.

For example, the syntax can define that the case in which the value of sps_mmvd_enabled_flag is "0" specifies that the MMVD cannot be used in the sequence corresponding to the SPS 211 and the case in which the value of sps_mmvd_enabled_flag is "1" specifies that the MMVD can be used in the sequence corresponding to the SPS 211.

Also, if the value of sps_mmvd_enabled_flag is "1", in other words, if the MMVD can be used, syntax (sps_mmvd_fullpel_only_flag) which controls whether the transmission precision of the MMVD in the sequence corresponding to the SPS 211 is to be integer precision or not may be additionally included.

For example, the syntax can define that the case in which the value of sps_mmvd_fullpel_only_flag is "0" specifies that fractional precision may be used as the transmission precision of the MMVD (in other words, both fractional precision and integer precision can be used as the transmission precision of the MMVD), and the case in which the value of sps_mmvd_fullpel_only_flag is "1" specifies that integer precision is used as the transmission precision of the MMVD.

If sps_mmvd_fullpel_only_flag is not included in the SPS 211, the decoding unit 210 may consider that the value of sps_mmvd_fullpel_only_flag is "0".

FIG. 6 is an example of the control data included in the PPS 212.

As described above, the PPS 212 at least includes the PPS id information (pps_pic_parameter_set_id) for identifying the PPS 212. Also, as described above, the PPS 212 at least includes the id information (pps_seq_parameter_set_id) for specifying the SPS 211 corresponding to the PPS 212.

FIG. 7 is an example of the control data included in the picture header 213.

As described above, the picture header 213 includes at least the id information (ph_pic_parameter_set_id) for specifying the PPS 212 corresponding to the picture header 213.

Also, if the value of sps_mmvd_fullpel_only_flag related to the PPS 212 specified by ph_pic_parameter_set_id is "0", the picture header 213 may include ph_mmvd_fullpel_only_flag.

If ph_mmvd_fullpel_only_flag is not included in the picture header 213, the decoding unit 210 may consider the value of ph_mmvd_fullpel_only_flag as "0".

The case in which the value of ph_mmvd_fullpel_only_flag is "1" specifies that integer precision is used as the transmission precision of the MMVD in the picture corresponding to the picture header 213.

On the other hand, the case in which the value of ph_mmvd_fullpel_only_flag is "0" specifies that fractional precision may be used as the transmission precision of the MMVD (in other words, both of fractional precision and integer precision can be used as the transmission precision of the MMVD) in the picture corresponding to the picture header 213.

If ph_mmvd_fullpel_only_flag is not included in the picture header 213, the decoding unit 210 may consider that the value of ph_mmvd_fullpel_only_flag is "0".

Alternatively, if ph_mmvd_fullpel_only_flag is not included in the picture header 213, the decoding unit 210 may consider the value of ph_mmvd_fullpel_only_flag as the same value as the value of sps_mmvd_fullpel_only_flag.

As described above, if the value of sps_mmvd_fullpel_only_flag is "0", in other words, only if it is indicated that fractional precision may be used as the transmission precision of the MMVD as a sequence unit, the syntax (ph_mmvd_fullpel_only_flag), which controls whether to use integer precision as the transmission precision of the MMVD as a picture unit or not, is included in the picture header 213. As a result, for example, in a case in which usage of integer precision is specified by sps_mmvd_fullpel_only_flag as the transmission precision of the MMVD in the sequence, unnecessary inclusion of ph_mmvd_fullpel_only_flag in the picture header 213 can be prevented. By virtue of this, wasteful decoding processing and/or encoding processing can be reduced, and the bit volume of the picture header 213 can be reduced.

FIG. 8 is an example of the control data included in the slice header 214A/214B.

The slice header 214A/214B may include sh_picture_header_in_slice_header_flag. If the value of sh_picture_header_in_slice_header_flag is "1", the syntax structure (picture_header_structure( )) of the picture header 213 described in FIG. 7 can be included at the position of picture_header_structure( ) in FIG. 8. Also, if the value of sps_mmvd_fullpel_only_flag related to the PPS 212 specified by ph_pic_parameter_set_id in the picture header 213 corresponding to the slice header 214A/214B is "0", the slice header 214A/214B may include slice_mmvd_fullpel_only_flag.

If slice_mmvd_fullpel_only_flag is not included in the slice header 214A/214B, the decoding unit 210 may consider the value of slice_mmvd_fullpel_only_flag as "0".

If the value of above described sps_mmvd_fullpel_only_flag is "1", the picture header 213 may include slice_mmvd_fullpel_only_flag.

The case in which the value of slice_mmvd_fullpel_only_flag is "1" specifies that integer precision is used as the transmission precision of the MMVD in the slice.

The case in which the value of slice_mmvd_fullpel_only_flag is "0" specifies that fractional precision may be used as the transmission precision of the MMVD (in other words, both of fractional precision and integer precision can be used as the transmission precision of the MMVD) in the slice.

If slice_mmvd_fullpel_only_flag is not included in the slice header 214A/214B, the decoding unit 210 may consider the value of slice_mmvd_fullpel_only_flag as "0".

Alternatively, if slice_mmvd_fullpel_only_flag is not included in the picture header 213, the decoding unit 210 may consider the value of slice_mmvd_fullpel_only_flag as the same value as the value of ph_mmvd_fullpel_only_flag.

As described above, if the value of sps_mmvd_fullpel_only_flag is "0", in other words, only if it is indicated that fractional precision may be used as the transmission precision of the MMVD as a sequence unit, the syntax (slice_mmvd_fullpel_only_flag), which controls whether to use integer precision as the transmission precision of the MMVD as a slice unit or not, is included in the slice header 214A/214B. As a result, for example, in a case in which usage of integer precision is specified by sps_mmvd_fullpel_only_flag as the transmission precision of the MMVD in the sequence, unnecessary inclusion of slice_mmvd_fullpel_only_flag in the slice header 214A/214B can be prevented. By virtue of this, wasteful decoding processing and/or encoding processing can be reduced, and the bit volume of the slice header 214A/214B can be reduced.

The values of the flags described above are merely examples. If the meanings given to the values ("0" and "1") of the flags are inverted, equivalent processing can be realized by correspondingly inverting the corresponding processing.

Also, the syntax for which any reference relation between the syntax is not present can mutually switch the decoding order thereof. Furthermore, the syntax other than that described above may be included in each of the SPS 211, the PPS 212, the picture header 213, and the slice header 214A/214B.

Modification Example

In the above described embodiment, the name of the syntax which controls the transmission precision of a merge motion vector difference in the sequence of the decoding target is defined as sps_mmvd_fullpell_only_flag. As the meaning (semantics) corresponding to the value of the syntax, the case in which the value of the syntax is "0" specifies that fractional precision may be used as the transmission precision of the MMVD (in other words, both fractional precision and integer precision can be used as the transmission precision of the MMVD), and the case in which the value of the syntax is "1" is defined to mean that integer precision is used as the transmission precision of the MMVD.

On the other hand, the name of the syntax which controls the transmission precision of a merge with motion vector difference in the sequence of the decoding target may be defined as sps_mmvd_fullpell_enabled_flag. As the meaning (semantics) corresponding to the value of the syntax, the case in which the value of the syntax is "0" may be defined to mean that fractional precision is used as the transmission precision of the MMVD, and the case in which the value of the syntax is "1" may be defined to mean that integer precision may be used as the transmission precision of the MMVD (in other words, both fractional precision and integer precision can be used as the transmission precision of the MMVD).

However, when the names and meanings (semantics) of the syntax which controls the transmission precision of a merge with motion vector difference in the sequence of the decoding target are defined in this manner, the decoding conditions of the syntax illustrated in FIG. 5, the decoding conditions of ph_mmvd_fullpel_only_flag illustrated in FIG. 7, and the decoding conditions of slice_mmvd_fullpel_only_flag illustrated in FIG. 8 are configured as illustrated in FIG. 9 to FIG. 11, respectively.

The difference of FIG. 10 from FIG. 7 and the difference of FIG. 11 from FIG. 8 are that, if the value of the syntax is "1", ph_mmvd_fullpel_only_flag or slice_mmvd_fullpel_only_flag is configured to be decoded as the meaning of the syntax has been changed.

(Inter Prediction Unit 241)

Figure 12:
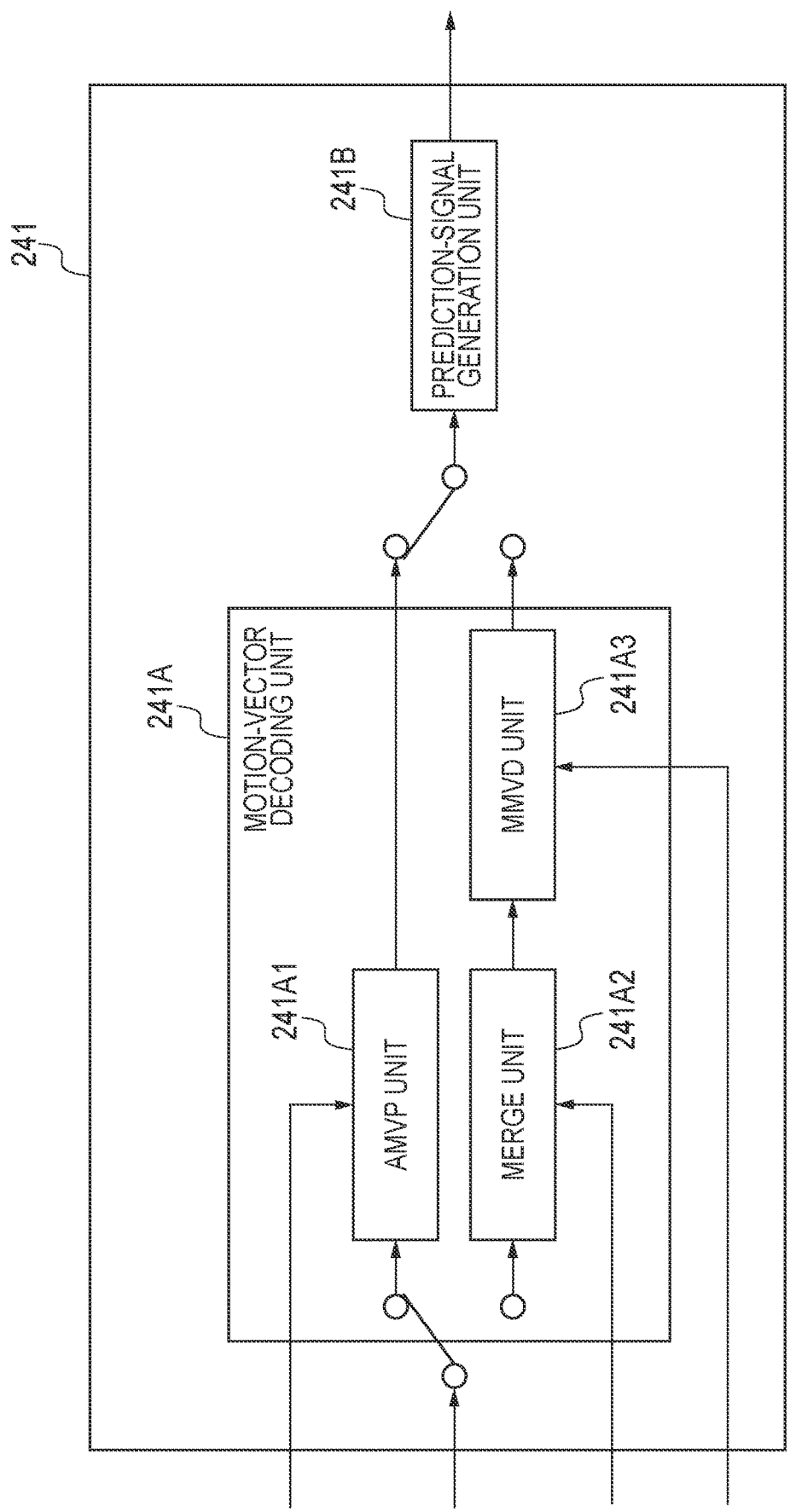
FIG. 12 is a diagram illustrating an example of function blocks of an inter prediction unit 241 according to the embodiment.

Hereinafter, with reference to FIG. 12, the inter prediction unit 241 according to the present embodiment will be described. FIG. 12 is a diagram illustrating an example of function blocks of the inter prediction unit 241 according to the present embodiment.

As illustrated in FIG. 12, the inter prediction unit 241 has a motion-vector decoding unit 241A and a prediction-signal generation unit 241B.

The inter prediction unit 241 is an example of a prediction unit which is configured to generate the prediction signal included in the prediction block based on motion vectors.

The motion-vector decoding unit 241A has an AMVP unit 241A1, a merge unit 241A2, and a MMVD unit 241A3. Herein, the motion-vector decoding unit 241A is configured to acquire the motion vectors by decoding the target frame and the reference frame input from the frame buffer 260 and the control data received from the image encoding device 100.

The AMVP unit 241A1 is configured to carry out adaptive motion vector prediction decoding (AMVP: Adaptive Motion Vector Prediction) which decodes the motion vectors by using indices showing motion vector predictions (MVP: Motion Vector Prediction) and motion vector differences (MVD: Motion Vector Difference) and lists and indices of reference frames. Since a known method can be employed as the AMVP, details thereof will be omitted.

The merge unit 241A2 is configured to receive a merge index from the image encoding device 100 and decode the motion vectors.

Specifically, the merge unit 241A2 is configured to build a merge list by the same method as the image encoding device 100 and acquire the motion vectors, which correspond to the received merge index, from the built merge list. Since a known method can be employed as the method of building the merge list, details thereof will be omitted.

The MMVD unit 241A3 selects the motion vector from the merge list built in the merge unit 241A2 and corrects the motion vector based on the syntax related to the MMVD transmitted from the image encoding device 100. Details will be described later.

The prediction-signal generation unit 241B is configured to generate the prediction signal based on the motion vector output from the motion-vector decoding unit 241A. Since a known method can be employed as the method of generating the prediction signal from the motion vector, details thereof will be omitted.

(MMVD Unit 241A3)

Hereinafter, with reference to FIG. 13 and FIG. 14, the MMVD unit 241A3 according to the present embodiment will be described.

FIG. 13 and FIG. 14 are diagrams illustrating a method of correcting the motion vector by the MMVD unit 241A3 according to the present embodiment.

The MMVD unit 241A3 is configured to select the motion vector from the merge list, which has been built in the merge unit 241A2, and correct the motion vector based on the value of syntax (mmvd_merge_flag, mmvd_cand_flag, mmvd_distance_idx, mmvd_direction_idx, ph_mmvd_fullpel_only_flag) related to the MMVD decoded by the decoding unit 210.

First, the MMVD unit 241A3 is configured to execute the MMVD if the value of mmvd_merge_flag is "1", and the MMVD unit 241A3 is configured not to execute the MMVD if the value of mmvd_merge_flag is "0".

Secondly, the MMVD unit 241A3 is configured to, if the MMVD has been executed, select the motion vector from the merge list based on the value of mmvd_cand_flag.

Specifically, the MMVD unit 241A3 is configured to select the 0th motion vector of the merge list as the motion vector to be corrected if the value of mmvd_cand_flag is "0", and the MMVD unit 241A3 is configured to select the 1st motion vector of the merge list as the motion vector to be corrected if the value of mmvd_cand_flag is "1".

Note that the MMVD unit 241A3 is configured to consider the value of mmvd_cand_flag as "0" if the merge list does not include two or more motion vector options.

Also, in the present embodiment, variations of the value of mmvd_cand_flag have been described as "0" or "1". However, this design can be changed depending on the intention of the designer.

Third, the MMVD unit 241A3 is configured to correct the selected motion vector based on the values of mmvd_distance_idx, mmvd_direction_idx, and ph_mmvd_fullpel_only_flag illustrated in FIG. 10 and FIG. 14.

Hereinafter, with reference to FIG. 13, a method of deriving the size (distance) of a motion vector difference to be added to the motion vector selected by the MMVD unit 241A3 will be described.

Specifically, the size (distance) of the motion vector difference is derived based on the values of decoded mmvd_distance_idx and ph_mmvd_fullpel_only_flag.

For example, as illustrated in FIG. 13, if the value of mmvd_distance_idx is "1" and the value of ph_mmvd_fullpel_only_flag is "0", MmvdDistance[x0][y0] is set to "2".

Herein, MmvdDistance[x0][y0] is an internal parameter representing the correction distance of the motion vector by the MMVD, in other words, the distance of the motion vector difference to be added to the selected motion vector.

If the value of MmvdDistance[x0][y0] is set to "2", ¼ precision which is the initial value of the transmission precision of the motion vector difference is multiplied by "2", and the ½ distance is configured to be added to the selected motion vector in the direction derived from later-described mmvd_direction_idx.

If the value of ph_mmvd_fullpel_only_flag is "1", the transmission precision of the motion vector difference to be added is configured to always have integer precision since the value to be added to the initial value of the transmission precision of the above described motion vector difference starts from "4".

The method of deriving the correction distance of the motion vector of the MMVD by ph_mmvd_fullpel_only_flag has been described above. However, ph_mmvd_fullpel_only_flag may be replaced by above described slice_mmvd_fullpel_only_flag.

Next, with reference to FIG. 14, a method of deriving the direction of the motion vector difference to be added to the motion vector selected by the MMVD unit 241A3 will be described.

Specifically, the direction of the motion vector difference is derived based on the value of decoded mmvd_direction_idx.

For example, as illustrated in FIG. 14, the value of MmvdSign[x0][y0][0] and the value of MmvdSign[x0][y0][1] are configured to be derived by the values "0" to "3" which are the values of mmvd_direction_idx.

The motion vector differences by the MMVD are derived as MmvdOffset[x0][y0][0] and MmvdOffset[x0][y0][1] which are derived from MmvdDistance[x0][y0], MmvdSign[x0][y0][0], and MmvdSign[x0][y0][1] as described below.

MmvdOffset[$x0$][$y0$][0]=(MmvdDistance[$x0$][$y0$]<<2)×Mmvd Sign[$x0$][$y0$][0]

MmvdOffset[$x0$][$y0$][1]=(MmvdDistance[$x0$][$y0$]<<2)×Mmvd Sign[$x0$][$y0$][1]

As described above, the motion vector difference, in other words, MmvdOffset derived by the MMVD unit 241A3 is added to the selected motion vector to correct the motion vector. As a result, the precision of the motion vector is improved, and prediction performance is improved. Therefore, encoding performance improvement is expected.

The foregoing image encoding device 100 and the image decoding device 200 may also be realized by a program that causes a computer to perform each function (each process).

Note that, in each of the foregoing embodiments, the present invention has been described by taking application to the image encoding device 100 and the image decoding device 200 by way of an example; however, the present invention is not limited only to such devices and can be similarly applied to encoding/decoding systems provided with each of the functions of an encoding device and a decoding device.

What is claimed is:
1. An image decoding device comprising:
  a decoding unit configured to decode first syntax that controls transmission precision of a merge with motion vector difference in a sequence parameter set (SPS), wherein
  the value of the first syntax being "1" specifies that both fractional precision and integer precision could be used as the transmission precision of the merge with motion vector difference in the sequence parameter set (SPS),
  the value of the first syntax being "0" specifies that the fractional precision is used as the transmission precision of a merge with motion vector difference in the sequence parameter set (SPS), and
  the decoding unit decodes a second syntax that controls transmission precision of a merge with motion vector difference in a picture header, when the value of the first syntax is a value specifying that both fractional precision and integer precision can be used as the transmission precision of the merge with motion vector difference in the sequence parameters set (SPS).
2. An image decoding method comprising:
  decoding first syntax that controls transmission precision of a merge with motion vector difference in a sequence parameter set (SPS), wherein
  the value of the first syntax being "1" specifies that both fractional precision and integer precision could be used as the transmission precision of the merge with motion vector difference in the sequence parameter set (SPS),
  the value of the first syntax being "0" specifies that the fractional precision is used as the transmission precision of a merge with motion vector difference in the sequence parameter set (SPS), and
  in the decoding, a second syntax that controls transmission precision of a merge with motion vector difference in a picture header is decoded, when the value of the first syntax is a value specifying that both fractional precision and integer precision can be used as the transmission precision of the merge with motion vector difference in the sequence parameter set (SPS).

3. A program stored on a non-transitory computer-readable medium, which when executed by a processor in a computer, causes the computer to function as an image decoding device, the image decoding device comprising:
a decoding unit configured to decode first syntax that controls transmission precision of a merge with motion vector difference in a sequence parameter set (SPS), wherein
the value of the first syntax being "1" specifies that both fractional precision and integer precision could be used as the transmission precision of the merge with motion vector difference in the sequence parameter set (SPS),
transmission precision the value of the first syntax being "0" specifies that the first syntax uses the fractional precision as the transmission precision of a merge with motion vector difference in the sequence parameter set (SPS), and
the decoding unit decodes a second syntax that controls transmission precision of a merge with motion vector difference in a picture header, when the value of the first syntax is a value specifying that both fractional precision and integer precision can be used as the transmission precision of the merge with motion vector difference in the sequence parameter set (SPS).

* * * * *